United States Patent
Sathiosatham et al.

(10) Patent No.: US 11,072,688 B2
(45) Date of Patent: Jul. 27, 2021

(54) NONTOXIC CATALYST FOR PREPARATION OF POLYSILOXANE (METH)ACRYLATES

(71) Applicant: Rohm and Haas Company, Collegeville, PA (US)

(72) Inventors: Muhunthan Sathiosatham, Chalfont, PA (US); James H. Pawlow, Aurora, OH (US); Lan T. P. Hoang Nguyen, Doylestown, PA (US)

(73) Assignee: Rohm and Haas Company, Collegeville, PA (US)

( * ) Notice: Subject to any disclaimer, the term of this patent is extended or adjusted under 35 U.S.C. 154(b) by 13 days.

(21) Appl. No.: 16/464,723

(22) PCT Filed: Nov. 9, 2017

(86) PCT No.: PCT/US2017/060821
§ 371 (c)(1),
(2) Date: May 29, 2019

(87) PCT Pub. No.: WO2018/111458
PCT Pub. Date: Jun. 21, 2018

(65) Prior Publication Data
US 2019/0309133 A1 Oct. 10, 2019

Related U.S. Application Data

(60) Provisional application No. 62/434,129, filed on Dec. 14, 2016.

(51) Int. Cl.
| | | |
|---|---|---|
| C08G 77/38 | (2006.01) |
| C08G 77/08 | (2006.01) |
| B01J 31/02 | (2006.01) |
| C08G 77/16 | (2006.01) |
| C08G 77/18 | (2006.01) |
| C08L 83/04 | (2006.01) |
| C08G 77/20 | (2006.01) |

(52) U.S. Cl.
CPC .......... *C08G 77/38* (2013.01); *B01J 31/0212* (2013.01); *C08G 77/08* (2013.01); *C08G 77/16* (2013.01); *C08G 77/18* (2013.01); *C08G 77/20* (2013.01); *C08L 83/04* (2013.01); *B01J 2231/49* (2013.01); *B01J 2531/002* (2013.01)

(58) Field of Classification Search
CPC ................................ C08G 77/08; C08G 77/20
See application file for complete search history.

(56) References Cited

U.S. PATENT DOCUMENTS

| | | | | |
|---|---|---|---|---|
| 4,777,265 | A | * | 10/1988 | Merger ................ C07D 233/32 540/460 |
| 4,940,766 | A | | 7/1990 | Gay et al. |
| 6,288,129 | B1 | * | 9/2001 | Gruning ................ C08G 77/38 435/135 |
| 7,071,351 | B2 | | 7/2006 | Schmitt et al. |
| 2006/0041097 | A1 | | 2/2006 | Herrwerth et al. |

\* cited by examiner

*Primary Examiner* — Marc S Zimmer
(74) *Attorney, Agent, or Firm* — Brian L. Mutschler

(57) ABSTRACT

A method for preparation of (meth)acrylate esters of polysiloxanes. The method comprises contacting in the presence of zirconium acetylacetonate or hafnium acetylacetonate: (i) a polysiloxane having at least two hydroxyl groups, each of which is attached to a carbon atom, and (ii) a $C_1$-$C_4$ alkyl (meth)acrylate.

8 Claims, No Drawings

NONTOXIC CATALYST FOR PREPARATION OF POLYSILOXANE (METH)ACRYLATES

This invention relates to a method for preparation of (meth)acrylate esters of polysiloxanes.

Use of catalysts for transesterification of hydroxy-functionalized polysiloxanes is known, e.g., in U.S. Pat. No. 4,940,766. However, this reference uses toxic tin compounds as catalysts and does not suggest the method described herein.

The problem solved by this invention is the need for improved preparations of (meth)acrylate esters of polysiloxanes.

STATEMENT OF THE INVENTION

The present invention provides a method for preparation of (meth)acrylate esters of polysiloxanes; said method comprising contacting in the presence of zirconium acetylacetonate or hafnium acetylacetonate:
(i) a polysiloxane having at least two hydroxyl groups, each of which is attached to a carbon atom, and (ii) a $C_1$-$C_4$ alkyl (meth)acrylate.

DETAILED DESCRIPTION

Percentages are weight percentages (wt %) and temperatures are in ° C. unless specified otherwise. Operations were performed at room temperature unless specified otherwise. The term "(meth)acrylic" means methacrylic or acrylic and "(meth)acrylate" means methacrylate or acrylate. Alkyl groups are saturated hydrocarbyl groups that may be straight or branched.

As used herein, unless otherwise indicated, the phrase "molecular weight" or $M_n$ refers to the number average molecular weight as measured by NMR analysis. Molecular weights are reported herein in units of g/mol.

The hydroxyl groups on the polysiloxane are attached to different carbon atoms, preferably either to terminal carbon atoms located at each end of the polysiloxane or as pendant groups on the chain of the polymer. Preferably, the polysiloxane comprises siloxane units having substituents which can be $C_1$-$C_{12}$ alkyl, phenyl or combinations thereof. Other functional groups may be present on siloxane units, e.g., alkenyl, dialkylaminoalkyl and glycidoxyalkyl. Preferably, siloxane units having phenyl, $C_1$-$C_{12}$, alkyl substituents or a combination thereof (preferably phenyl or $C_1$-$C_4$ alkyl) comprise at least 50 wt % of the polysiloxane, preferably at least 75 wt %, preferably at least 85 wt %. Preferably, the siloxane has from two to ten hydroxyl groups, preferably from two to five hydroxyl groups, preferably two or three hydroxyl groups. In a preferred embodiment of the invention, the siloxane has only pendant hydroxyl-functional groups. In another preferred embodiment, the siloxane has only terminal hydroxy-functional groups. Preferably the polysiloxane has formula (I)

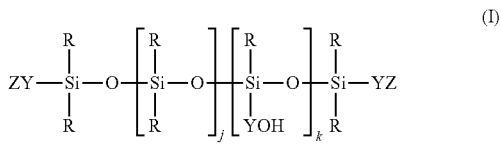

wherein R is $C_1$-$C_{12}$, alkyl or phenyl; Y is a $C_1$-$C_{18}$ alkylene linker or a group of formula —$(CH_2)_o(OCH_2CHR^1)_p$OH in which $R^1$ is hydrogen, methyl or ethyl; o is from 1 to 6, p is from 1 to 30; j is from 3 to 200, k is 0 or from 2 to 10 and Z is hydroxyl or hydrogen. In a preferred embodiment of the invention, when Z is hydroxyl, k is 0; i.e., there are only terminal hydroxyl-functional groups. In another preferred embodiment, when Z is hydrogen k is at least 2; i.e., there are only pendant hydroxyl-functional groups.

"R" groups on the siloxane may in some cases be different on different siloxane units, i.e., the siloxane may be a copolymer; "Y" groups also may be different. Preferably, R represents the same alkyl group wherever it appears, preferably $C_1$-$C_4$ alkyl or phenyl, preferably methyl or phenyl, preferably methyl. Preferably, Y is the same wherever it appears.

Preferably, $R^1$ is methyl or hydrogen, preferably hydrogen. $R^1$ may represent more than one group in a particular substituent group, e.g., in mixed ethylene oxide/propylene oxide chains. In one preferred embodiment, Z is hydroxyl and k is 0. Preferably, j is at least 5, preferably at least 6, preferably at least 7; preferably no greater than 100, preferably no greater than 70, preferably no greater than 50, preferably no greater than 40, preferably no greater than 30. Preferably, o is at least 2; preferably no greater than 5. Preferably, p is at least 2, preferably at least 3, preferably at least 4, preferably at least 5; preferably no greater than 20, preferably no greater than 15. The parameters k, j, o and p are number averages. In a preferred embodiment, k is at least 2, preferably at least 3; preferably no more than 6, preferably no more than 5.

A $C_1$-$C_{18}$ alkylene linker is a difunctional radical derived from an alkane by removing two hydrogen atoms. This group has two points of attachment; on the left-hand side of formula (I), Y has one to a hydroxyl group and one to a silicon atom. Preferably, Y is a $C_1$-$C_{12}$ alkylene linker, preferably $C_1$-$C_8$, preferably $C_2$-$C_8$, preferably $C_1$-$C_6$, preferably $C_2$-$C_6$. Preferably, Y is linear, i.e., it has the formula —$(CH_2)_n$—, wherein n is from 1 to 18; preferably at least 2; preferably no more than 12, preferably no more than 8, preferably no more than 6, preferably no more than 5. Preferably, Y represents the same group wherever it appears on the polysiloxane. Preferably, Z is hydroxyl.

Preferably, the $C_1$-$C_4$ alkyl (meth)acrylate is methyl methacrylate, methyl acrylate, ethyl methacrylate, ethyl acrylate, butyl methacrylate or butyl acrylate; preferably methyl methacrylate, methyl acrylate, ethyl methacrylate or ethyl acrylate; preferably methyl methacrylate.

Preferably, the catalyst is zirconium acetylacetonate (Zr$(acac)_4$).

Preferably, the amount of catalyst, as mole percent of the hydroxyl equivalents on the polysiloxane, is from 0.1 to 5%; preferably at least 0.2%, preferably 0.3%, preferably at least 0.35%; preferably no more than 3%, preferably no more than 1%, preferably no more than 0.7%, preferably no more than 0.6%.

Preferably, the reaction temperature is from 20 to 140° C.; preferably at least 40° C., preferably at least 60° C., preferably at least 70° C.; preferably no greater than 120° C., preferably no greater than 90° C. Reaction times are dependent on polysiloxane structure and temperature, but may be determined by those skilled in the art. Typically, reaction times are from 1 to 12 hours. Preferably, the $C_1$-$C_4$ alcohol resulting from transesterification is removed by distillation during the reaction. Preferably, the pressure in the reaction vessel is from 1 to 200 mm Hg (0.1 to 27 kPa).

In a preferred embodiment, the (meth)acrylate ester of a polysiloxane has the following structure

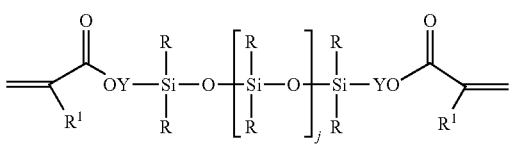

wherein R, Y and j are as defined above, and R' (in this structure) is methyl or hydrogen; preferably, R' is methyl.

Preferably, the number-average molecular weight ($M_n$) of the polysiloxane is from 300 to 20,000; preferably at least 400, preferably at least 500; preferably no greater than 15,000, preferably no greater than 10,000, preferably no greater than 7,000, preferably no greater than 5,000, preferably no more than 3,000, preferably no more than 2,000.

EXAMPLES

Inventive Example 1

To a 1000 ml 4 necked flask fitted with a stirrer, thermometer, 10-tray Oldershaw column was added PDMS-bis (propyl alcohol) (208.6 g, 0.18 mol), methyl methacrylate (90.5 g, 0.9 mol) zirconium acetylacetonate (4.4 g, 0.01 mol) and 4-hydroxy TEMPO (34 mg). The solution was heated to 115° C. under vacuum (550 mmHg) and distillate was collected at the vapor temperature of 57° C. with a reflux/distillation split ratio of 5/1 and the distillate was collected in fractions over a 2.5 hour period, weighed accurately and analyzed by quantitative $^1$H-NMR. The amount of methanol collected was estimated from the NMR data and conversion was calculated from the MeOH removed. Conversion was determined to be >90% and the Oldershaw column was replaced with a distillation head and excess MMA was removed under reduced pressure. Resulting monomer solution weighed 230 g (conversion>92%).

Comparative Example

To a 1000 ml 4 necked flask fitted with a stirrer, thermometer, 10-tray Oldershaw column was added PDMS-bis (propyl alcohol) (424 g, 0.37 mol), methyl methacrylate (185.2 g, 1.85 mol) and 4-hydroxy TEMPO (34 mg). The resulting solution was dehydrated under vacuum (550 mmHg) at 102° C., approximately 30 g of distillate was collected. To the pot solution was added dibutyl tin oxide (1.2 g, 0.01 mol). The solution was heated to 115° C. under vacuum (550 mmHg) and distillate was collected at the vapor temperature of 57° C. with a reflux/distillation split ratio of 5/1 and the distillate was collected in fractions over a 5 hour period, weighed accurately and analyzed by quantitative $^1$H-NMR. The amount of methanol collected was estimated from the NMR data and conversion was calculated from the MeOH removed. Conversion was determined to be 88% and the Oldershaw column was replaced with a distillation head and excess MMA was removed under reduced pressure. Resulting monomer solution weighed 450 g (conversion 91%).

Inventive Example 2

A 1 L, 5-necked flask fitted with a temperature monitoring thermocouple, a 10-tray Oldershaw column/automatic distillation head, and a gas inlet tube was charged with approximately 95.0 g (0.949 mol) methyl methacrylate, 190.5 g (0.225 mol OH) (carbinol functional)methylsiloxane-dimethylsiloxane copolymer (having ca. 2-5 pendant groups comprising $-(CH_2)_3O(CH_2CH_2O)_{4-8}H$ and Mn ca. 4000), along with MEHQ (0.54 g, 2000 ppm) and 4-HT (0.20 g, 750 ppm) inhibitors. The mixture was then heated at a pressure of 500 mm Hg under an 8% $O_2/N_2$ purge. When the temperature of the flask contents reached 100° C., the contents of the solution started to boil, and the vapor temperature rose to 88-89° C. Over the next hour, 10 mL of distillate was drawn off using a reflux ratio of 5:1.

After cooling to RT, a single charge of 1.0 g Zr(acac)$_4$ (0.002 mol) was added to the flask. The flask contents were then heated at 500 mm Hg under an 8% $O_2/N_2$ purge. After 1 hour, no evidence of MMA-methanol azeotrope formation was observed. The flask was then cooled to RT, and a second charge of 4.0 g Zr(acac)$_4$ (0.008 mol) was added to the flask contents. Heating under reduced pressure was resumed. Within 30 minutes, MMA-MeOH azeotrope formation was observed (pot temperature 112° C., initial vapor temperature 62° C.). The flask contents were refluxed for 30 minutes until the vapor temperature dropped to a constant 57° C. At this point, the azeotrope was distilled off using a reflux ratio of 10:1. In 30 minutes, approximately 15 mL of distillate was obtained. As the vapor temperature increased to 89° C., an additional 5 mL distillate was collected. The distillate was weighed and analyzed via NMR spectroscopy. Conversion was determined to be 86.0% based upon the quantity of methanol in the distillate.

Excess MMA was removed from the product using simple distillation under reduced pressure until no further volatiles were able to be removed (<2% residual MMA). The final product was 199.1 g of a transparent reddish-orange liquid of moderate viscosity. NMR analysis of the product indicated approximately 85% of the hydroxyl groups were converted into methacrylate moieties.

Inventive Example 3

A 1 L, 5-necked flask fitted with a temperature monitoring thermocouple, a 10-tray Oldershaw column/automatic distillation head, and a gas inlet tube was charged with approximately 136.1 g (1.36 mol) methyl methacrylate and 196 g (0.115 mol OH) of 9 dimethyl siloxane, dimethyl(propyl (polyethylene oxide)hydroxyl)siloxy-terminated (having only terminal groups comprising $-(CH_2)_3O(CH_2CH_2O)_{10-20}H$ and Mn ca. 2000-3000), along with MEHQ (0.25 g, 800 ppm) and 4-HT (0.1 g, 300 ppm) inhibitors. The mixture was then heated at a pressure of 500 mm Hg under an 8% $O_2/N_2$ purge. When the temperature of the flask contents reached 100° C., the contents of the solution started to boil, and the vapor temperature rose to 88-89° C. Over the next hour, around 35 mL of distillate was drawn off using a reflux ratio of 5:1.

After cooling to RT, a single charge of 2.2 g (0.0045 mole) Zr(acac)$_4$ was added to the flask. The flask contents were then heated at 500 mm Hg under an 8% $O_2/N_2$ purge. Within 30 minutes, MMA-MeOH azeotrope formation was observed (pot temperature 105° C., initial vapor temperature 57° C.). The contents were refluxed for 30 minutes until the vapor temperature reached 56° C. At this point, the azeotrope was removed via distillation using a reflux ratio of 10:1. In 30 minutes, approximately 10 mL of distillate was obtained. An additional 5 mL distillate was collected as the vapor temperature increased to 89° C. The distillate was weighed and analyzed via NMR spectroscopy. Conversion was determined to be 97.9% based upon the quantity of methanol in the distillate.

Excess MMA was removed from the product using simple distillation under reduced pressure until NMR analysis indicated less than 1% residual MMA. The final product was 200.1 g of a transparent orange-yellow liquid of moderate viscosity. NMR analysis of the product indicated >98% esterification of the hydroxyl groups to methacrylate moieties.

The invention claimed is:

1. A method for preparation of (meth)acrylate esters of polysiloxanes; said method comprising contacting in the presence of hafnium acetylacetonate:
   (i) a polysiloxane having at least two hydroxyl groups, each of which is attached to a carbon atom, and (ii) a $C_1$-$C_4$ alkyl (meth)acrylate.

2. The method of claim 1 in which the polysiloxane comprises siloxane units having phenyl substituents, $C_1$-$C_{12}$ alkyl substituents or a combination thereof.

3. The method of claim 2 in which siloxane units having phenyl, $C_1$-$C_{12}$ alkyl substituents or a combination thereof comprise at least 50 wt % of the polysiloxane and the polysiloxane has from two to ten hydroxyl groups.

4. The method of claim 3 in which the polysiloxane has formula (I)

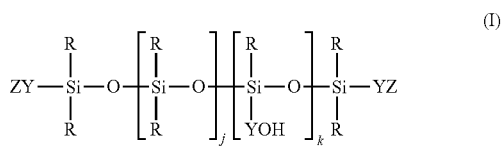

wherein R is $C_1$-$C_{12}$ alkyl or phenyl; Y is a $C_1$-$C_{18}$ alkylene linker or a group of formula
—$(CH_2)_o(OCH_2CHR^1)_pOH$ in which $R^1$ is hydrogen, methyl or ethyl; o is from 1 to 6, p is from 1 to 30; j is from 3 to 200, k is 0 or from 2 to 10 and Z is hydroxyl or hydrogen.

5. The method of claim 4 in which k is 0 and Z is hydroxyl.

6. The method of claim 5 in which j is from 5 to 70.

7. The method of claim 6 in which R is phenyl or $C_1$-$C_4$ alkyl and Y is a $C_2$-$C_8$ alkylene linker.

8. The method of claim 7 in which R is methyl, j is from 5 to 40.

* * * * *